United States Patent
Park et al.

(10) Patent No.: US 11,811,341 B2
(45) Date of Patent: Nov. 7, 2023

(54) MOTOR DRIVE APPARATUS AND HOME APPLIANCE HAVING SAME

(71) Applicant: LG Electronics Inc., Seoul (KR)

(72) Inventors: Kyungtae Park, Seoul (KR); Dongwook Kim, Seoul (KR); Sunil Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 16/768,156

(22) PCT Filed: Nov. 27, 2018

(86) PCT No.: PCT/KR2018/014707
§ 371 (c)(1),
(2) Date: May 29, 2020

(87) PCT Pub. No.: WO2019/107872
PCT Pub. Date: Jun. 6, 2019

(65) Prior Publication Data
US 2020/0318279 A1   Oct. 8, 2020

(30) Foreign Application Priority Data

Nov. 29, 2017   (KR) .......................... 10-2017-0162207

(51) Int. Cl.
*H02P 21/36*     (2016.01)
*D06F 37/40*     (2006.01)
(Continued)

(52) U.S. Cl.
CPC .............. *H02P 21/36* (2016.02); *D06F 34/10* (2020.02); *D06F 37/40* (2013.01); *H02P 3/18* (2013.01);
(Continued)

(58) Field of Classification Search
CPC .......... H02M 7/5387; B41M 5/00; C08F 2/10
(Continued)

(56) References Cited

U.S. PATENT DOCUMENTS 4,990,844 A   2/1991   Gritter et al.
6,721,119 B1  4/2004   Hassan et al.
(Continued)

FOREIGN PATENT DOCUMENTS

CN   1521938     8/2004
CN   101824730   9/2010
(Continued)

OTHER PUBLICATIONS

Office Action in Korean Appln. No. 10-2017-0162207, dated Feb. 15, 2022, 18 pages (with English translation).
(Continued)

*Primary Examiner* — Bickey Dhakal
*Assistant Examiner* — Zemenay T Truneh
(74) *Attorney, Agent, or Firm* — Fish & Richardson P.C.

(57) ABSTRACT

A home appliance having a motor includes: an inverter unit; and an inverter control unit for controlling a switching operation of the inverter unit, wherein the inverter control unit generates a braking command for braking the motor, on the basis of an operating mode of the home appliance, and controls the inverter unit to stop the motor when a preset braking time elapses after the braking command is generated, and to execute a first braking mode in which the rotational speed of the motor is reduced in a state where no current flows in the inverter control unit, and then to execute at least one of a second braking mode and a third braking mode in which the rotational speed of the motor is reduced in a state where a current flows in the inverter control unit.

18 Claims, 9 Drawing Sheets

(51) Int. Cl.
    *H02P 3/18*     (2006.01)
    *H02P 27/06*     (2006.01)
    *D06F 34/10*     (2020.01)
    *D06F 103/00*     (2020.01)
    *D06F 103/46*     (2020.01)
    *D06F 105/52*     (2020.01)
    *D06F 34/08*     (2020.01)

(52) U.S. Cl.
    CPC .............. *H02P 27/06* (2013.01); *D06F 34/08* (2020.02); *D06F 2103/00* (2020.02); *D06F 2103/46* (2020.02); *D06F 2105/52* (2020.02)

(58) Field of Classification Search
    USPC .......................................................... 34/572
    See application file for complete search history.

(56) References Cited

U.S. PATENT DOCUMENTS

| | | | |
|---|---|---|---|
| 9,013,124 B2 * | 4/2015 | Itoh | ........................... H02P 3/22 |
| | | | 318/599 |
| 2004/0160208 A1 | 8/2004 | Youm et al. | |

FOREIGN PATENT DOCUMENTS

| | | | |
|---|---|---|---|
| JP | 2003305294 | | 10/2003 |
| JP | 2008-035925 | | 2/2008 |
| JP | 2008307413 A | * | 2/2008 |
| JP | 2008307413 A | * | 2/2008 |
| JP | 2017-123767 | | 7/2017 |
| JP | 2017123767 | * | 7/2017 |
| KR | 100488523 | | 5/2005 |
| KR | 1020050066446 | | 6/2005 |
| KR | 20080106125 | | 12/2008 |
| KR | 20110047007 | | 5/2011 |
| KR | 101649632 | | 8/2016 |

OTHER PUBLICATIONS

Office Action in Chinese Appln. No. 201880077363.1, dated Jan. 18, 2023, 18 pages (with English translation).

* cited by examiner

MOTOR DRIVE APPARATUS AND HOME APPLIANCE HAVING SAME

CROSS-REFERENCE TO RELATED APPLICATIONS

This application is a National Stage application under 35 U.S.C. § 371 of International Application No. PCT/KR2018/014707, filed on Nov. 27, 2018, which claims the benefit of Korean Application No. 10-2017-0162207, filed on Nov. 29, 2017. The disclosures of the prior applications are incorporated by reference in their entirety.

FIELD

The present disclosure relates to a motor drive apparatus and a home appliance having the same. One implementation relates to a motor drive apparatus capable of utilizing input power to the maximum and a home appliance having the same.

BACKGROUND

The motor drive apparatus is an apparatus for driving a motor that includes a rotor performing a rotary motion and a stator wound with a coil.

Meanwhile, motor drive apparatuses may be classified into a sensor type motor drive apparatus using a sensor and a sensorless type motor drive apparatus without a sensor.

Recently, the sensorless type motor drive apparatus is widely used for reasons such as reduction in manufacturing cost, and accordingly, researches on such sensorless type motor drive apparatus have been conducted for efficiently driving a motor.

This sensorless type motor drive apparatus is mounted on various types of home appliances. Examples of the home appliance may include a laundry treating apparatus, an air conditioner, and a cleaner.

Among others, laundry treating apparatuses may be classified into a top-loading type and a front-loading type depending on a laundry input method.

The top-loading type laundry treating apparatus includes a cabinet forming an outer appearance, a tub disposed inside the cabinet to provide a space for accommodating laundry or clothes, and an introduction port provided on an upper surface of the cabinet to communicate with the tub.

The front-loading type laundry treating apparatus includes a cabinet forming an outer appearance, a tub disposed inside the cabinet to provide a space for accommodating laundry, and an introduction port provided on a front surface of the cabinet to communicate with the tub.

In this way, the laundry treating apparatus is equipped with a motor drive apparatus to rotate the tub for accommodating the laundry (clothing). Recently, a direct drive method of directly transferring the rotational force is more preferred than the related art method of indirectly transferring a rotational force of a motor to a rotating shaft of the tub, and a rotational speed is also greatly increased to improve dehydration performance and achieve rapid dehydration.

In recent years, a laundry treating apparatus is provided with a gear box disposed between a motor and a tub, and thus a gear ratio of the gear box can be adjusted according to an operating mode of the laundry treating apparatus. The adjustment of the gear ratio of the gearbox is intended to increase energy efficiency of the laundry treating apparatus.

On the other hand, the application of the direct drive method and the gearbox has caused a rapid increase in a motor rotational speed of the laundry treating apparatus which is operating in a dehydration mode.

Accordingly, in the case of using a motor braking method that was applied at the end of dehydration in the existing laundry treating apparatus, a large amount of currents flows in the motor drive apparatus and thereby temperatures of some components included in the motor drive apparatus increase to dangerous levels.

Specifically, the rotational speed of the motor at the time of starting to terminate dehydration in the related art laundry treating apparatus is approximately 100 RPM to 200 RPM, and the rotational speed of the motor at the time of starting to terminate dehydration in the laundry treating apparatus equipped with the direct-drive type gearbox is approximately 600 RPM to 700 RPM.

In addition, when the existing motor braking method which is dynamic braking is applied at the time of terminating dehydration of the laundry treating apparatus equipped with the direct-drive type gearbox, lower-arm switches within an inverter unit are all turned on to perform the dynamic braking. Accordingly, a current excessively flows in an intelligent power module (IPM) in the motor drive apparatus.

In general, the IPM must be operated below a designed limit temperature to ensure stability. When the temperature of the IPM exceeds the limit temperature due to the flow of the excessive amount of currents in the IPM, it may cause a failure of the IPM. As a result, the flow of the excessive amount of currents in the IPM may lower stability of the motor drive apparatus during the process of braking the motor to terminate a dehydration mode.

In this regard, Korean Patent Application Publication No. 10-2005-0066446 (published on Jun. 30, 2005) discloses a motor control device of a washing machine, in which plugging braking is first carried out to terminate a dehydration process and then is switched to dynamic braking when a specific condition is satisfied.

However, the method disclosed in Korean Patent Application Publication No. 10-2005-0066446 is not enough to supply a sufficiently low current to the IPM when braking the motor turning at 500 RPM or higher.

Particularly, in the trend of reducing the size and capacity of the IPM, those problems become more complicated. Accordingly, it is needed to study a motor braking method of controlling an inverter unit, so that a motor currently rotating at a high speed can be stopped and simultaneously a current flowing in a control unit cannot increase to a dangerous level or higher.

Technical Problem

A technical problem of the present disclosure is to provide a motor drive apparatus, capable of preventing temperatures of an inverter unit and an inverter control unit from rising above dangerous levels while braking a motor rotating at a high speed in order to stop the motor, and a home appliance including the same.

That is, an aspect of the present disclosure is to reduce a size and capacity of an inverter control unit required for the motor to maintain the same performance by way of decreasing a magnitude of a current flowing through an inverter unit and the inverter control unit during braking of the motor and lowering a temperature rise of the inverter control unit.

Another aspect of the present disclosure is to provide a motor drive apparatus capable of maintaining a constant braking time of a motor, irrespective of a size of a load generated due to a rotating object, and a home appliance including the same.

That is, an aspect of the present disclosure is to enhance performance of a home appliance having a motor by way of providing a motor braking method for maintaining a motor braking time constantly.

Technical Solution

A home appliance including a motor according to an embodiment of the present disclosure for achieving the above aspects and other advantages may include an inverter unit configured to transfer power applied from an input power source to the motor, and an inverter control unit configured to control an operation of the inverter unit.

Here, the inverter unit may be provided with a plurality of pairs of switches connected in series with each other, and implement a plurality of phases corresponding to the plurality of pairs of switches, respectively.

The inverter control unit may generate a braking command for braking the motor, on the basis of an operating mode of the home appliance. When a preset braking time elapses after the braking command is generated, the inverter control unit may control the inverter unit to execute a first braking mode in which a rotational speed of the motor is reduced in a state where no current flows in the inverter control unit, and then to execute at least one of a second braking mode and a third braking mode in which the rotational speed of the motor is reduced in a state where a current flows in the inverter control unit, so that the motor stops.

In one embodiment, the inverter control unit may turn off all of the switches included in the inverter unit so that the first braking mode is executed.

In one embodiment, the inverter control unit may control the inverter unit to generate a reverse phase current with respect to a rotating direction of the motor, so that the second braking mode is executed.

In one embodiment, the inverter control unit may turn off all of upper-arm switches and turn on all of lower-arm switches, included in the pairs of switches, so that the third braking mode is executed.

In one embodiment, the inverter control unit may control the inverter unit to execute the third braking mode after the execution of the second braking mode.

In one embodiment, the inverter control unit may control the inverter unit to preferentially execute the first braking mode until the rotational speed of the motor falls below a first speed after the braking command is generated.

In one embodiment, the inverter control unit may control the inverter unit to execute the second braking mode until the rotational speed of the motor fall below a second speed lower than the first speed.

In one embodiment, the inverter control unit may control the inverter unit to execute the third braking mode until the motor stops when the second braking mode is completed.

In one embodiment, the inverter control unit may execute the first to third braking modes in a preset order, and a sum of each time for which the first to third braking modes are executed may correspond to the preset braking time.

In one embodiment, the inverter control unit may variably set a time interval, in which the third braking mode is executed, based on the rotational speed of the motor at a time point that the braking command has been generated.

In one embodiment, the inverter control unit may decrease the time interval, in which the third braking mode is executed, when the rotational speed of the motor at the time point that the braking command has been generated increases.

In one embodiment, the inverter control unit may set, based on the preset braking time, a first time interval in which the first braking mode is executed, a second time interval in which the second braking mode is executed, and a third time interval in which the third braking mode is executed, respectively.

In one embodiment, the inverter control unit may set the first to third time intervals such that a sum of the first to third time intervals corresponds to the preset braking time.

In one embodiment, the inverter control unit may set a difference between the preset braking time and a predetermined time value as the first time interval.

In one embodiment, the inverter control unit may detect the rotational speed of the motor at a time point that the braking command has been generated, and set the first to third time intervals based on the detected rotational speed.

In one embodiment, the inverter control unit may set at least one of the second and third time intervals based on the detected rotational speed, and set a difference between the preset braking time and the set at least one of the second and third time intervals to the first time interval.

In one embodiment, the inverter control unit may decrease the third time interval when the detected rotational speed increases.

In one embodiment, the inverter control unit may calculate a magnitude of a current, which flows in a part thereof when the third braking mode is applied to the motor, by using the detected rotational speed, and set at least one of the first to third time intervals based on the calculated magnitude of the current.

In one embodiment, the inverter control unit may store information related to at least one of a limit temperature and a limit current of the inverter unit and the inverter control unit, and set at least one of the first to third time intervals based on the stored information and the detected rotational speed.

Advantageous Effects

According to a home appliance of the present disclosure and a motor drive apparatus provided therein, when a motor is suddenly braked, a magnitude (amount) of current flowing in an inverter unit and an inverter control unit can be reduced, which may result in enhancing driving safety of the motor.

The present disclosure can achieve an effect that a size and capacity of the inverter control unit required for the motor to maintain the same performance is reduced. That is, it is sufficient if a limit current of a motor drive apparatus according to the present disclosure is designed based on 5A, compared to the related art in which the limit current of the motor drive apparatus is designed based on 15A.

In addition, the present disclosure can derive an effect of constantly maintaining a braking time of the motor, regardless of a size of a load generated by a rotating object. This may result in increasing an actual working time of the home appliance equipped with the motor.

BEST MODE FOR CARRYING OUT EMBODIMENTS

Hereinafter, the present disclosure will be described in detail with reference to the drawings.

Hereinafter, the present disclosure will be described in detail with reference to the drawings.

Figure 1A:
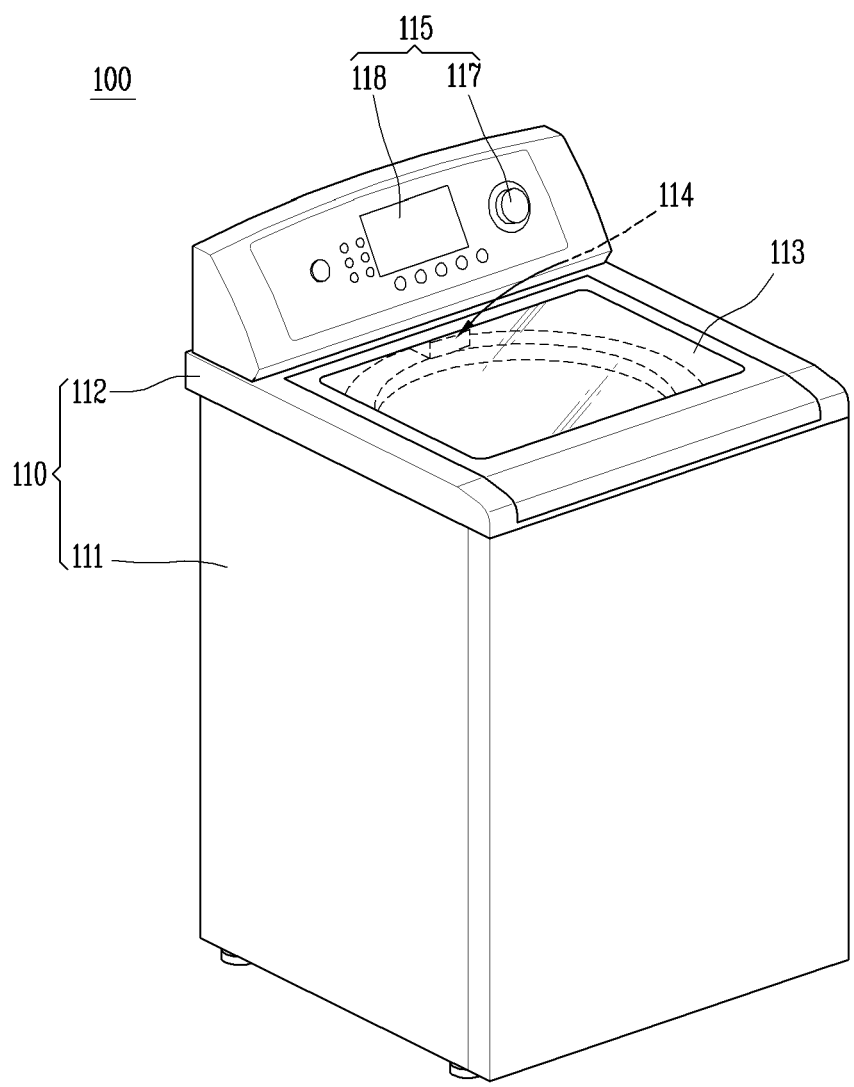
FIG. 1A is a perspective view of a laundry treating apparatus in accordance with one embodiment of the present disclosure.
Figure 1B:
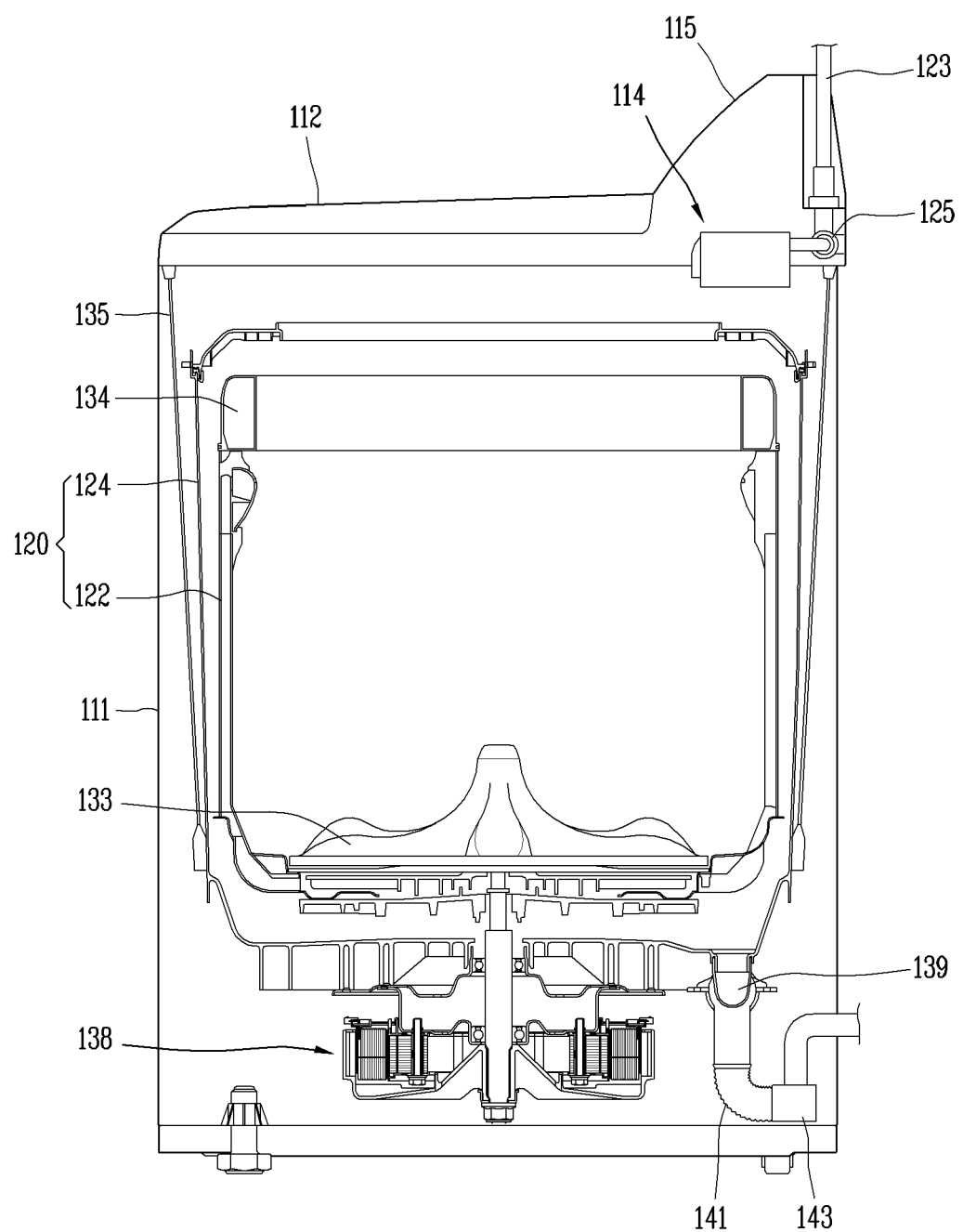
FIG. 1B is a lateral sectional view of the laundry treating apparatus of FIG. 1A.

FIG. 1A is a perspective view of a laundry treating apparatus in accordance with one embodiment of the present disclosure, and FIG. 1B is a lateral sectional view of the laundry treating apparatus of FIG. 1A. For reference, the laundry treating apparatus illustrated in FIGS. 1A and 1B is defined as a top-loading type.

As illustrated in FIGS. 1A and 1B, a laundry treating apparatus 100 according to one embodiment of the present disclosure includes a washing machine which performs washing, rinsing, dewatering and the like of clothes or laundry introduced therein, or a dryer which performs drying wet clothes introduced therein. Hereinafter, a description will be given mainly of a washing machine.

Referring to FIGS. 1A and 1B, a description will be given exemplarily of a top-loading type washing machine. However, the technical idea of the present disclosure is not limited to the top-loading type washing machine, and may be applied to any kind of laundry treating apparatus if it is provided with a BLDC motor.

The washing machine 100 includes a casing 110 forming an outer appearance, a control panel 115 provided with operation keys for receiving various control commands from a user, and a display for displaying information related to an operating state of the washing machine 100, and a door rotatably installed at the casing 110 to open and close an inlet/outlet hole through which the laundry is taken in and out.

The casing 110 includes a main body 111 forming a space in which various components of the washing machine 100 can be accommodated, and a top cover 112 provided on a top of the main body 111 and having a clothes inlet/outlet hole through which the clothes or laundry can be taken in and out.

The casing 110 is described as including the main body 111 and the top cover 112 but it is not limited to this. It is sufficient if the casing 110 forms the appearance of the washing machine 100.

Support rods 135 are described as being coupled to the top cover 112 which is one of the constituent elements of the casing 110. The support rods 135 are not limited to the structure but may be coupled to any of fixed portions of the casing 110.

The control panel 115 includes operation keys 117 for controlling operating states of the laundry treating apparatus 100, and a display 118 disposed at one side of the operation keys 117 for displaying the operating states of the laundry treating apparatus 100.

The door 113 opens and closes a clothes inlet/outlet hole (not shown) formed at the top cover 112, and may include a transparent member made of tempered glass so that an inside of the main body 111 can be seen.

The washing machine 100 may include a washing tub 120. The washing tub 120 may include an outer tub 124 containing washing water and an inner tub 122 rotatably installed in the outer tub 124 to receive laundry. A balancer 134 may be provided on a top of the washing tub 120 to compensate for eccentricity generated when the washing tub 120 rotates.

Meanwhile, the washing machine 100 may include a pulsator 133 rotatably provided at a lower portion in the washing tub 120.

A drive apparatus 138 is to supply a driving force for rotating the inner tub 122 and/or the pulsator 133. A clutch (not shown) for selectively transmitting the driving force of the drive apparatus 138 may be provided so that only the inner tub 122 or only the pulsator 133 rotates or both the inner tub 122 and the pulsator 133 rotates simultaneously.

Meanwhile, the top cover 112 is provided with a detergent box 114 disposed therein to be drawn in and out to contain various detergents, such as laundry detergent, fabric softener and/or bleach. Washing water fed through a feedwater flow path 123 is supplied into the inner tub 122 via the detergent box 114.

A plurality of holes (not shown) are formed through the inner tub 122 so that the washing water supplied to the inner tub 122 flows to the outer tub 124 through the plurality of holes. A feedwater valve 125 for opening and closing the feedwater flow path 123 may be provided.

The washing water inside the outer tub 124 is drained through a drain flow path 141. A drain valve 143 for opening and closing the drain flow path 141 and a drain pump 139 for pumping up the washing water may be provided.

The support rods 135 are to suspend the outer tub 124 in the casing 110. Each support rod 135 has one end connected to the casing 110 and another end connected to the outer tub 124 by a suspension 150.

The suspension 150 buffers vibration of the outer tub 124 during the operation of the washing machine 100. For example, the outer tub 124 may vibrate due to vibration generated as the inner tub 122 rotates. It may be possible to buffer the vibration of the outer tub 124 which is caused by various factors such as an eccentric state of the laundry contained in the inner tub 122, a rotational speed of the inner tub 122, resonance characteristics, and the like.

Hereinafter, another embodiment of a laundry treating apparatus will be described with reference to FIG. 2. For reference, the laundry treating apparatus shown in FIG. 2 is defined as a front-loading type.

Figure 2:
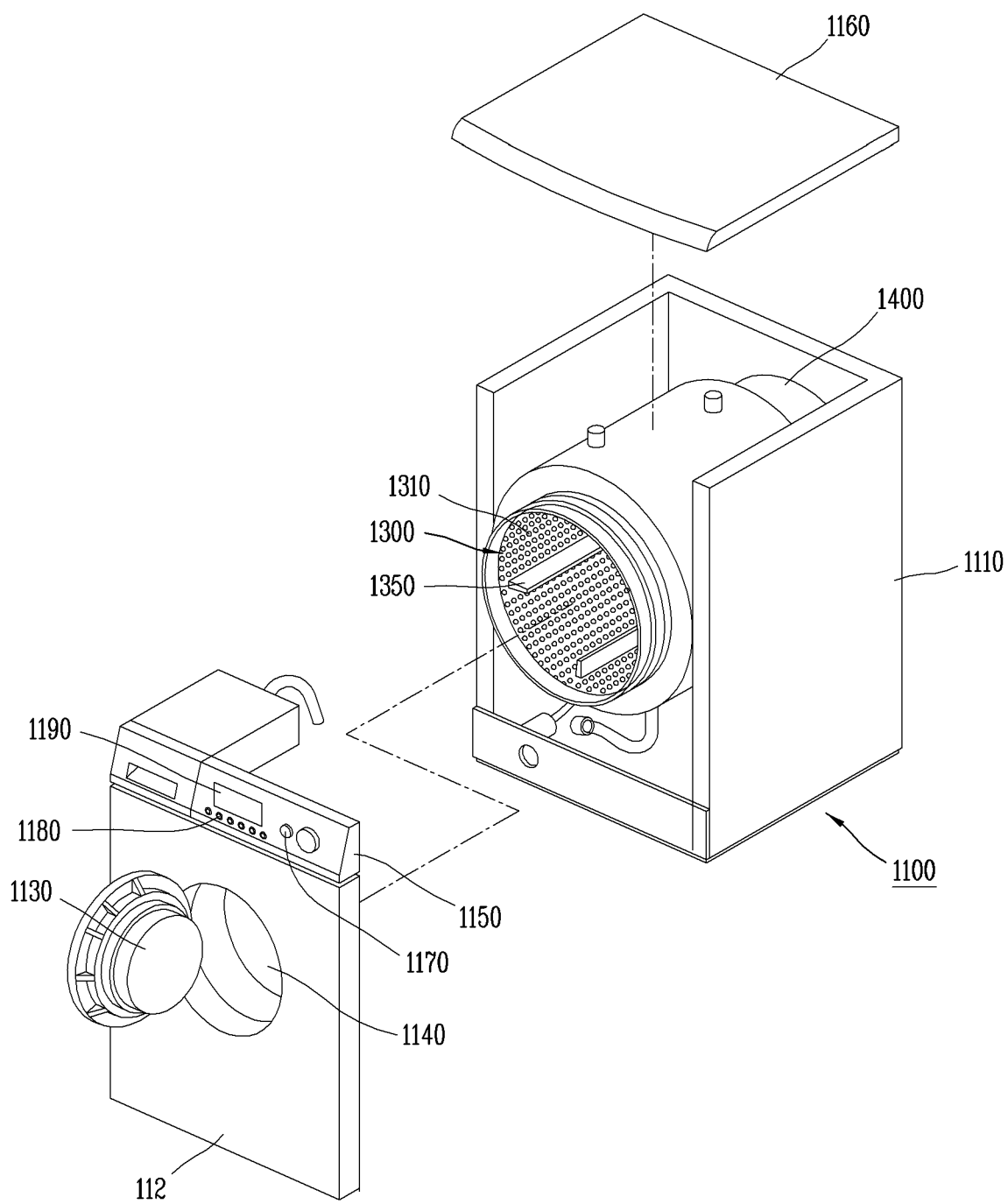
FIG. 2 is an exploded perspective view of a laundry treating apparatus in accordance with another embodiment of the present disclosure.

Referring to FIG. 2, a laundry treating apparatus includes a cabinet 1100 forming an outer appearance, a tub 1200 provided in the cabinet and supported by the cabinet, a drum 1300 rotatably provided in the tub to accommodate the laundry, a motor to rotate the drum by applying torque to the drum, and a control panel 1150 to allow a user to select an operating mode of the laundry treating apparatus or apply an input related to an execution of the selected operating mode.

The cabinet 1100 includes a main body 1110, a cover 1120 coupled to a front surface of the main body, and a top plate 1160 coupled to a top of the main body. The cover 1120 may include an opening 1140 through which the laundry is introduced or taken out, and a door 1130 to selectively open and close the opening.

The drum 1300 forms a space in which the introduced laundry is washed. The drum 1300 is rotated by receiving power from the motor. The drum 1300 may be provided with a plurality of through holes 1310, so that washing water stored in the tub 1200 can be introduced into the drum 1300 and washing water inside the drum can be discharged to the tub through the through holes 1310. Therefore, when the drum rotates, dirt is removed from the laundry introduced into the drum during friction with the washing water stored in the tub.

The control panel 1150 may receive a user input related to an operation of the laundry treating apparatus. At the same time, the control panel 1150 may also include a display to output information related to an operating state of the laundry treating apparatus.

That is, the control panel 1150 can implement an interface with the user.

Specifically, the control panel 1150 includes an operation unit 1170, 1180 to allow the user to input a control command, and a display unit 1190 to display control information according to the control command. The control panel may include a control unit (not shown) to control an operation of the laundry treating apparatus including an operation of the motor according to the control command.

Figure 3:
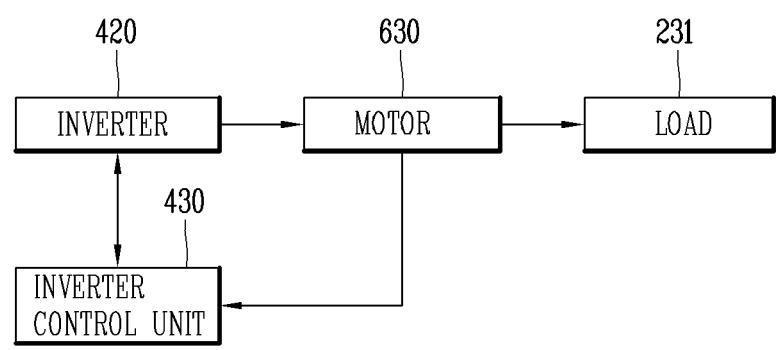
FIG. 3 is an internal block diagram illustrating an example of a motor drive apparatus of a home appliance illustrated in FIG. 1A or FIG. 2.
Figure 4:
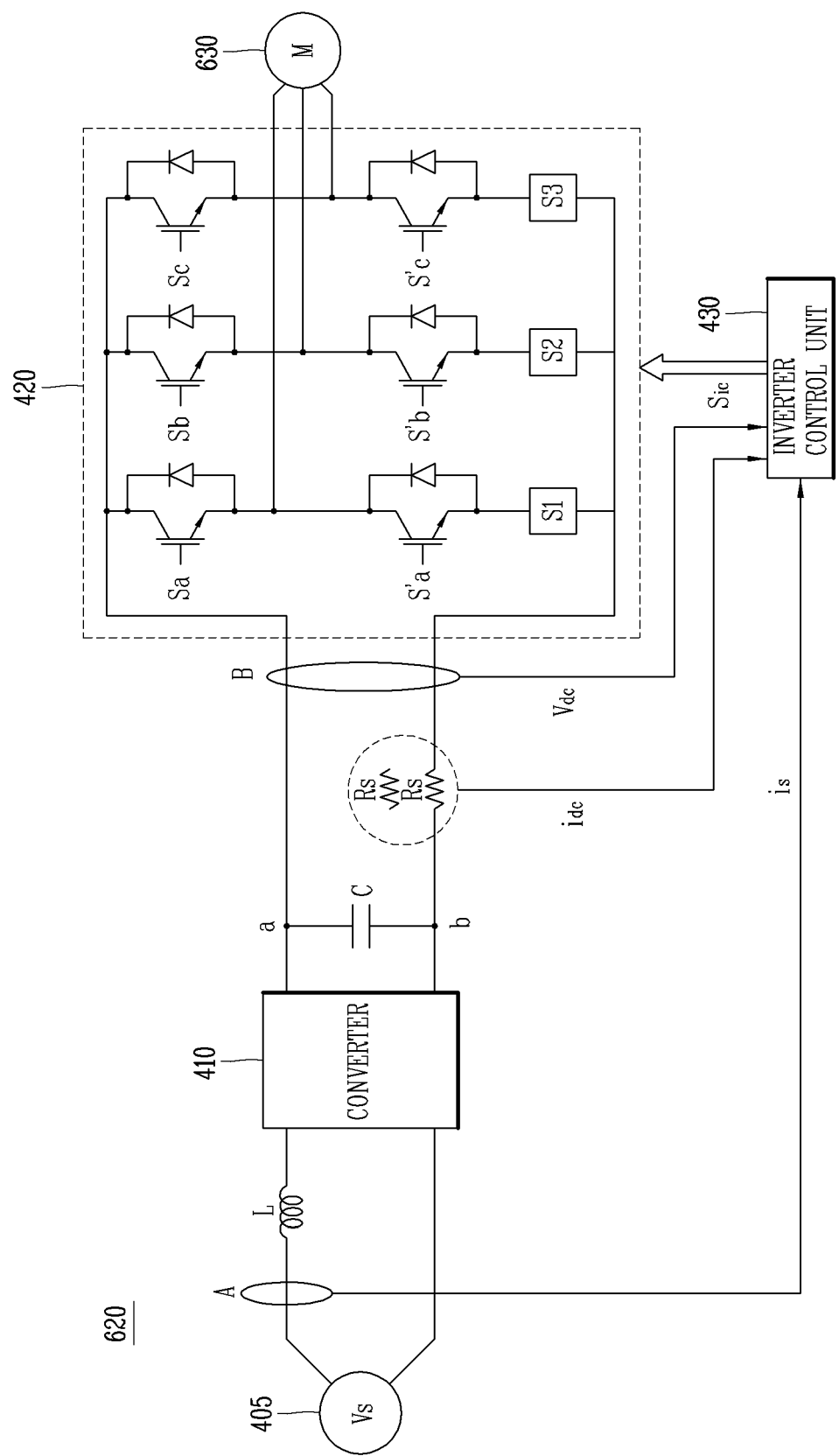
FIG. 4 is an internal circuit view illustrating the example of the motor drive apparatus of FIG. 3.

FIG. 3 is an internal block diagram illustrating an example of a motor drive apparatus of a home appliance illustrated in FIG. 1A or FIG. 2, and FIG. 4 is an internal circuit view illustrating the example of the motor drive apparatus of FIG. 3.

Referring to those drawings, the motor drive apparatus 620 according to the embodiment of the present disclosure is configured to drive the motor 630 in a sensorless manner and may include an inverter unit 420, and an inverter control unit 430.

For reference, the inverter control unit 430 may be substantially the same configuration as a control unit for controlling components of a home appliance equipped with the motor drive apparatus 620, or may correspond to a part of a circuit constituting the control unit.

The motor drive apparatus 620 according to the embodiment of the present disclosure may include a converter 410, a DC-link voltage detection unit B, a smoothing capacitor C, a DC-link current detection unit Rs, and phase-current detection units S1, S2, and S3.

Hereinafter, an operation of each component in the motor drive apparatus 620 of FIGS. 3 and 4 will be described.

The reactor L is disposed between a commercial AC power source 405, Vs and the converter 410 to perform a power factor correction or a boosting operation. The reactor L may also perform a function of limiting a harmonic current due to fast switching of the converter 410.

The input current detection unit A may detect an input current Is applied from the commercial AC power source 405. To this end, a current transformer (CT), a shunt resistor, or the like may be used as the input current detection unit A. The detected input current Is may be input to the inverter control unit 430 as a pulse type discrete signal.

The converter 410 converts AC power, which has been applied from the commercial AC power source 405 via the reactor L, into DC power and outputs the DC power. Although the commercial AC power source 405 is shown as a single-phase AC power source in the drawing, it may be a three-phase AC power source. An internal structure of the converter 410 also changes depending on a type of the commercial AC power source 405.

Meanwhile, the converter 410 may be configured as a diode or the like without a switching element, and may perform a rectification operation without a separate switching operation.

For example, in the case of a single-phase AC power source, four diodes may be used in a bridge configuration. On the other hand, in the case of a three-phase AC power source, six diodes may be used in a bridge configuration.

On the other hand, the converter 410, for example, may be a half-bridge type converter in which two switching elements and four diodes are connected. In the case of a three-phase AC power source, six switching elements and six diodes may be used.

When the converter 410 includes a switching element, the converter 410 may perform a boosting operation, a power factor correction, and a DC power conversion by a switching operation of the switching element.

The smoothing capacitor C smooths input power and stores it. In the drawing, one element is illustrated as the smoothing capacitor C, but a plurality of smoothing capacitors may alternatively be provided to ensure element stability.

The smoothing capacitor C is illustrated in the drawing as being connected to an output end of the converter 410, but the present disclosure is not limited to this. Alternatively, AC power may be input directly to the smoothing converter 410. For example, DC power from a solar cell may be input to the smoothing capacitor C directly or after DC/DC conversion. Hereinafter, the portions illustrated in the drawing will be mainly described.

On the other hand, both ends of the smoothing capacitor C may be referred to as DC-links or DC-link ends since DC power is stored.

The DC-link voltage detection unit B may detect voltages Vdc of the DC-links which are both ends of the smoothing capacitor C. To this end, the DC-link voltage detection unit B may include a resistor element, an amplifier, and the like. The detected DC-link voltage Vdc may be input to the inverter control unit 430 as a pulse type discrete signal.

The inverter unit 420 may include a plurality of inverter switching elements, and convert smoothed DC power Vdc into three-phase AC power va, vb, vc having a predetermined frequency by a switching-on/off operation of the switching elements so as to output the three-phase AC power va, vb, vc to a three-phase synchronous motor 630.

The inverter unit 420 is provided with upper-arm switching elements Sa, Sb and Sc and lower-arm switching elements S'a, S'b and S'c which are connected in series as pairs, respectively, and thus totally three pairs of upper- and lower-arm switching elements Sa & S'a, Sb & S'b, and Sc & S'c are connected in parallel. Diodes are connected in reverse-parallel to the switching elements Sa, S'a, Sb, S'b, Sc, S'c, respectively.

That is, the first upper-arm switch Sa and the first lower-arm switch S'a implement a first phase. The second upper-arm switch Sb and the second lower-arm switch S'b implement a second phase. In addition, the third upper-arm switch Sc and the third lower-arm switch S'c may implement a third phase.

In addition, a first shunt resistor S1 is connected to one end of the first lower-arm switch S'a of the first switch pair (Sa, S'a). Likewise, a second shunt resistor S2 is connected to one end of the second lower-arm switch S'b, and a third shunt resistor S3 is connected to one end of the third lower-arm switch S'c.

The switching elements in the inverter unit 420 are switched on and off based on an inverter switching control signal Sic from the inverter control unit 430. Accordingly, the three-phase AC power having the predetermined frequency is output to the three-phase synchronous motor 630.

The inverter control unit 430 may control the switching operation of the inverter unit 420 in a sensorless manner. For this purpose, the inverter control unit 430 may receive an output current idc detected by an output current detection unit E.

The inverter control unit 430 outputs the inverter switching control signal Sic to the inverter unit 420 in order to control the switching operation of the inverter unit 420. The inverter switching control signal Sic is a pulse width modulation (PWM) type switching control signal, and is generated and output based on the output current idc detected by the output current detection unit E.

The DC-link current detection unit Rs may detect the output current idc flowing in a three-phase motor 630.

The DC-link current detection unit Rs may be arranged between the DC-link capacitor C and the inverter unit 420 to detect the output current idc flowing in the motor.

In particular, the DC-link current detection unit Rs may include one shunt resistor element Rs.

The DC-link current detection unit Rs may use the single shunt resistor element Rs to detect a phase current as the output current idc flowing in the motor 630 in a time division manner when the lower-arm switch of the inverter unit 420 is turned on.

Phase current detectors S1, S2, and S3 may be connected to the lower-arm switches of respective phases, to detect a phase current flowing in at least one of the plurality of switches.

The detected output current idc which is the pulse type discrete signal may be applied to the inverter control unit 430 and the inverter switching control signal Sic is generated based on the detected output current idc. Hereinafter, a description will be given under the assumption that the detected output current idc corresponds to three-phase output currents ia, ib, ic.

On the other hand, the three-phase motor 630 has a stator and a rotor, and each phase AC power of a predetermined frequency is applied to a coil of the stator of each phase (a, b, c phases), thereby rotating the rotor.

The motor 630 may include a brushless DC (BLDC) motor.

For example, the motor 630 may include a Surface Mounted Permanent Magnet Synchronous Motor (SMPMSM), an Interior Permanent Magnet Synchronous Motor (IPMSM), and a Synchronous Reluctance Motor (Synrm), and the like. Among others, the SMPMSM and the IPMSM are Permanent Magnet Synchronous Motors (PMSMs) employing a permanent magnet, and the Synrm does not use a permanent magnet.

Figure 5:
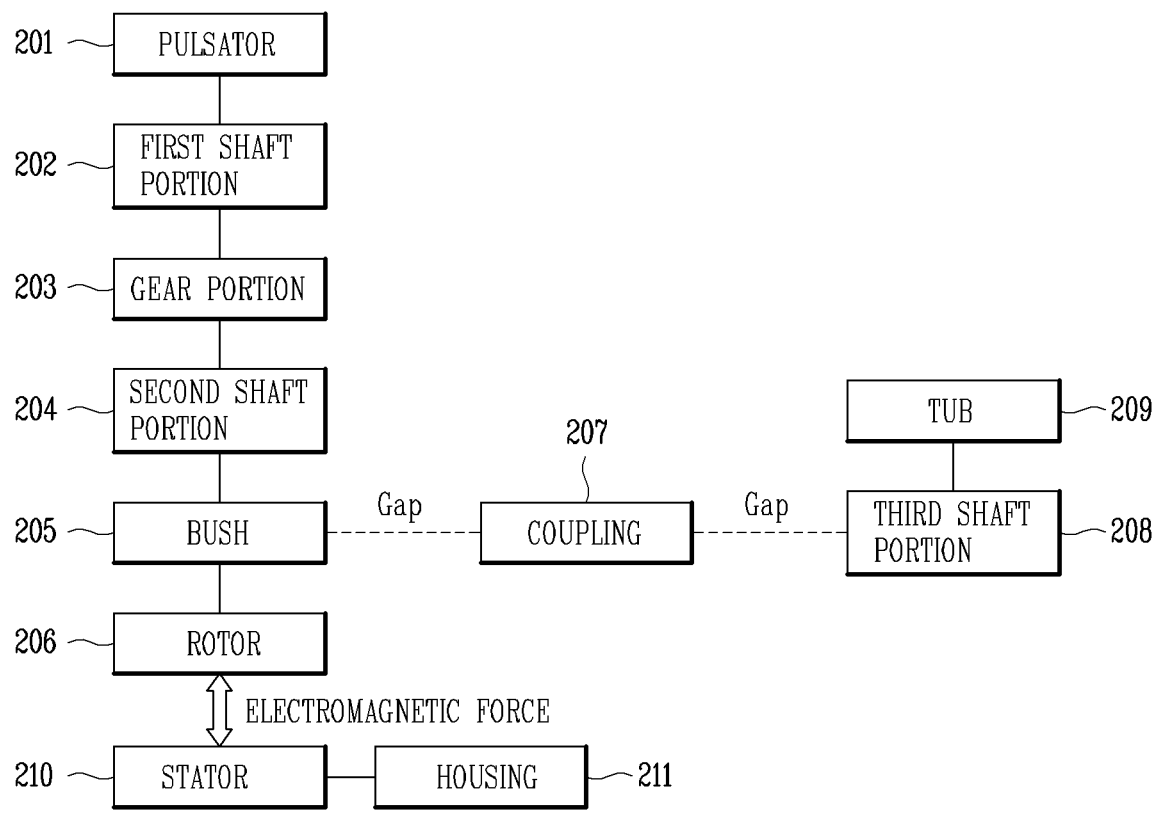
FIG. 5 is a block diagram illustrating components of a washing machine equipped with a gear portion.
Figure 6:
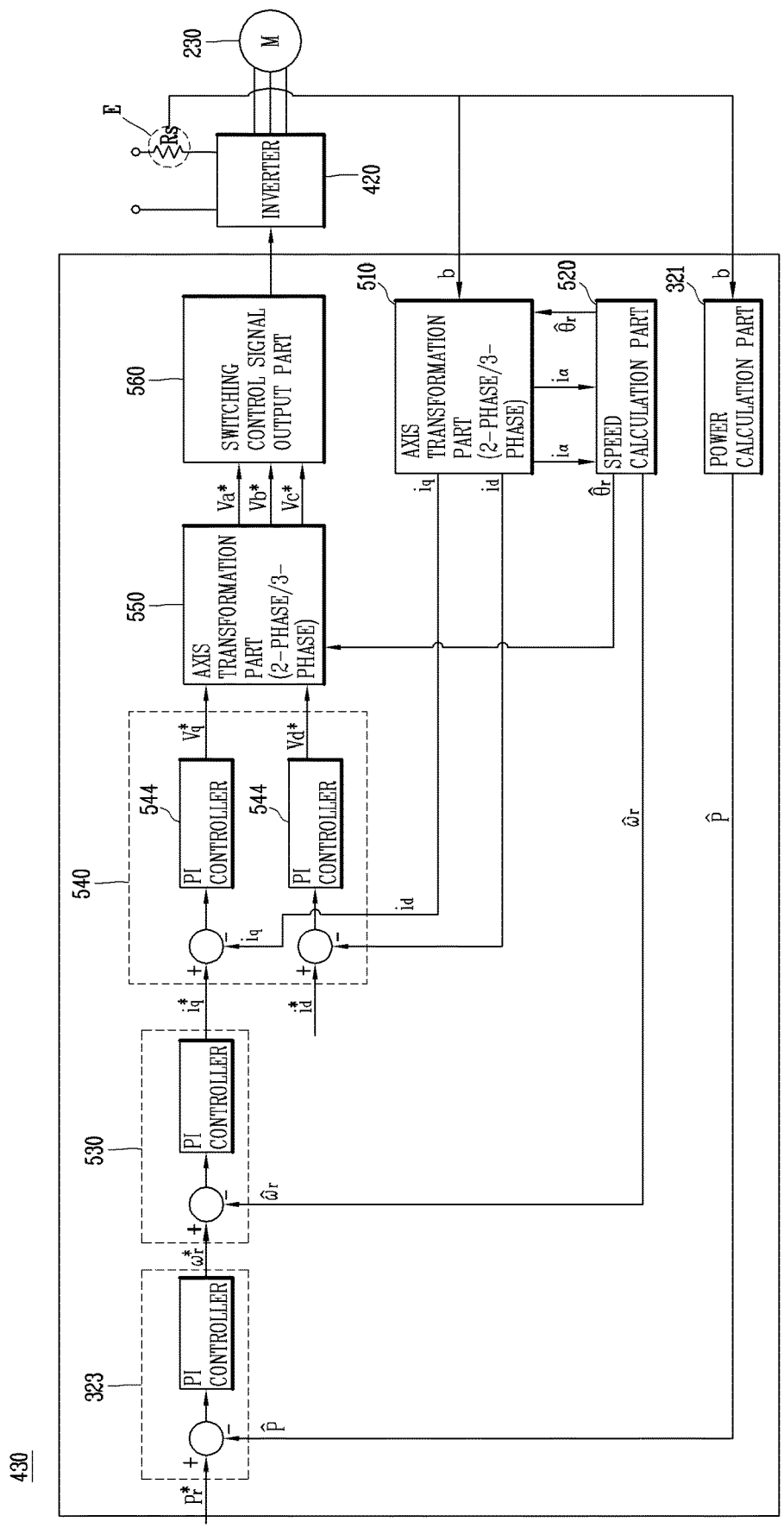
FIG. 6 is an internal block diagram of an inverter control unit of FIG. 4.

FIG. 6 is an internal block diagram of the inverter control unit of FIG. 5.

Referring to FIG. 6, the inverter control unit 430 may include an axis transformation part 510, a speed calculation part 520, a power calculation part 321, a speed command generation part 323, a current command generation part 530, a voltage command generation part 540, an axis transformation part 550, and a switching control signal output part 560.

The axis transformation part 510 may extract the respective phase currents ia, ib and ic from the output current idc detected by the output current detection unit E, and transform the extracted phase currents ia, ib and ic into two-phase currents iα and iβ of a stationary reference frame.

On the other hand, the axis transformation part 510 may transform the two-phase currents iα and iβ of the stationary reference frame into two-phase currents id and iq of a rotating reference frame.

The speed calculation part 520 may estimate a position $\hat{\theta}_r$ based on the output current idc detected by the output current detection unit E and calculate a speed $\hat{\omega}_r$ by differentiating the estimated position.

The power calculation part 321 may calculate power or a load of the motor 630 based on the output current idc detected by the output current detection unit E.

The speed command generation part 323 generates a speed command value ω*r based on power P calculated by the power calculation part 321 and a power command value P*r. For example, the speed command generation part 323 may perform a PI control in a PI controller 325 based on a difference between the calculated power P and the power command value P*r, and generate the speed command value ω*r.

On the other hand, the current command generation part 530 generates a current command value i*q based on the calculated speed $\hat{\omega}_r$ and the speed command value ω*r. For example, the current command generation part 530 may perform a PI control in a PI controller 535 based on a difference between the calculated speed $\hat{\omega}_r$ and the speed command value ω*r, and generate the current command value i*q. In the drawing, a q-axis current command value i*q is illustrated as the current command value, but it is also possible to generate a d-axis current command value i*d as well, unlike the drawing. On the other hand, the d-axis current command value i*d may be set to zero.

On the other hand, the current command generation part 530 may further include a limiter (not shown) for limiting a level of the current command value i*q so that the current command value i*q does not exceed an allowable range.

Next, the voltage command generation part 540 generates d-axis and q-axis voltage command values v*d and v*q based on d-axis and q-axis currents id and iq that are axially transformed to the two-phase rotating reference frame in the axis transformation part and the current command values i*d and i*q from the current command generation part 530. For example, the voltage command generation part 540 may perform a PI control in a PI controller 544 based on a difference between the q-axis current iq and the q-axis current command value i*q, and generate the q-axis voltage command value v*q. The voltage command generation part 540 may perform a PI control in a PI controller 548 based on a difference between the d-axis current id and the d-axis current command value i*d, and generate the d-axis voltage command value v*d. The voltage command generation part 540 may further include a limiter (not shown) for limiting a level of the d-axis and q-axis voltage command values v*d and v*q, so that the d-axis and q-axis voltage command values v*d and v*q do not exceed an allowable range.

On the other hand, the generated d-axis and q-axis voltage command values v*d, v*q are input to the axis transformation part 550.

The axis transformation part 550 performs an axis transformation by receiving the position $\hat{\theta}_r$ calculated by the speed calculation part 520 and the d-axis and q-axis voltage command values v*d and v*q.

First, the axis transformation part 550 performs conversion from the two-phase rotating reference frame to the two-phase stationary reference frame. At this time, the position $\hat{\theta}_r$ calculated by the speed calculation part 520 may be used.

Then, the axis transformation part 550 performs conversion from the two-phase stationary reference frame to the three-phase stationary reference frame. Through these conversions, the axis transformation part 1050 outputs three-phase output voltage command values v*a, v*b, and v*c.

The switching control signal output part 560 generates an inverter switching control signal Sic according to a pulse width modulation (PWM) method based on the three-phase output voltage command values v*a, v*b and v*c, and outputs the generated inverter switching control signal Sic.

The output inverter switching control signal Sic may be transformed into a gate driving signal in a gate driving part (not shown) and input to a gate of each switching element in the inverter unit 420. As a result, each of the switching elements Sa, S'a, Sb, S'b, Sc and S'c in the inverter unit 420 performs the switching operation.

Figure 7:
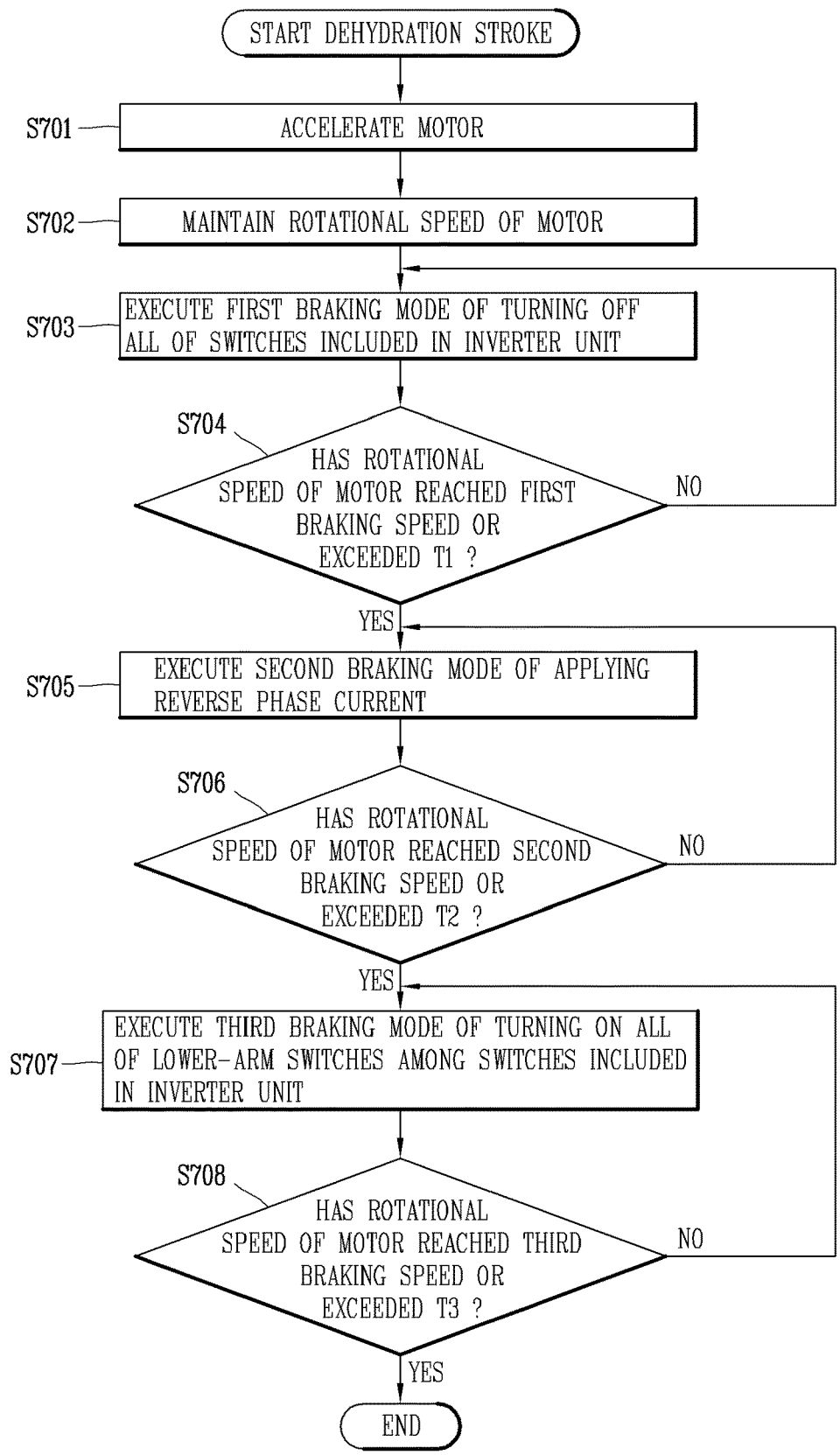
FIG. 7 is a flowchart illustrating a motor braking method in accordance with the present disclosure.

Hereinafter, a motor braking method according to the present disclosure will be described with reference to FIG. 7.

When a dehydration stroke is started, the inverter control unit 430 may accelerate the motor for a preset acceleration time (S701). When a rotational speed (RPM) of the motor reaches a predetermined speed value, the rotational speed of the motor may be maintained for a preset holding time (S702).

Thereafter, the inverter control unit 430 may execute a first braking mode of turning off all the switches included in the inverter unit 430 (S703).

After the execution of the first braking mode, the inverter control unit 430 may determine whether the rotational speed of the motor has reached a preset first braking speed, or whether a time for which the first braking mode is executed has exceeded a first time T1 (S704).

When the rotational speed of the motor has reached the preset first braking speed or the time for which the first braking mode is executed has exceeded the first time T1, the inverter control unit 430 may switch the first braking mode into a second braking mode in which a reverse phase current is applied (S705).

Conversely, the inverter control unit 430 may maintain the first braking mode when the rotational speed of the motor is higher than the preset first braking speed and the time for which the first braking mode is executed is shorter than the first time T1.

After the execution of the second braking mode, the inverter control unit 430 may determine whether the rotational speed of the motor has reached a preset second braking speed or whether a time for which the second braking mode is executed has exceeded a second time T2 (S706).

When the rotational speed of the motor has reached the preset second braking speed or the time for which the second braking mode is executed has exceeded the second time T2, the inverter control unit 430 may terminate the second braking mode and execute a third braking mode for turning on all the lower-arm switches among those switches included in the inverter unit (S707).

On the other hand, the inverter control unit 430 may maintain the second braking mode when the rotational speed of the motor is higher than the preset second braking speed and the time for which the second braking mode is executed is shorter than the second time T2.

Also, after the execution of the third braking mode, the inverter control unit 430 may determine whether the rotational speed of the motor has reached a preset third braking speed or whether a time for which the third braking mode is executed has exceeded a third time T3 (S708).

The inverter control unit 430 may stop the braking of the motor when the rotational speed of the motor has reached the preset third braking speed or the time for which the third braking mode is executed has exceeded the third time T3.

As such, the inverter control unit 430 may generate a braking command for braking the motor based on an operating mode of the home appliance.

The inverter control unit 430 may execute a motor braking algorithm to stop the motor when a preset braking time has elapsed after the braking command is generated.

In detail, the inverter control unit 430 may control the inverter unit to first execute the first braking mode for reducing the rotational speed of the motor in a state where no current flows in the inverter control unit, and then execute at least one of the second braking mode and the third braking mode for reducing the rotational speed of the motor in a state where a current flows in the inverter control unit.

In one embodiment, the first braking mode may correspond to redundant braking, which turns off all the switches of the inverter unit.

In another embodiment, the second braking mode may correspond to plugging braking (or reversing-phase braking) for controlling the inverter unit to generate a reverse phase current with respect to a rotating direction of the motor.

In another embodiment, the third braking mode may correspond to dynamic braking, in which the upper-arm switches of the switch pairs are all turned off and the lower-arm switches are all turned on.

That is, the motor drive apparatus according to the present disclosure can minimize a magnitude of a current (or an amount of currents) flowing in the inverter control unit by first executing the first braking mode that is the redundant braking, then executing the second braking mode that is the plugging braking, and executing the third braking mode that is the dynamic braking when the second braking mode is completed.

In one embodiment, the inverter control unit may control the inverter unit so that the first braking mode is preferentially executed until the rotational speed of the motor falls below a first speed after a braking command is generated.

The inverter control unit may also control the inverter unit so that the second braking mode is executed until the rotational speed of the motor falls below a second speed lower than the first speed.

When the second braking mode is completed, the inverter control unit may control the inverter unit to execute the third braking mode until the motor stops.

In another embodiment, the inverter control unit may execute the first to third braking modes in a preset order. The sum of each time for which the first to third braking modes are executed may correspond to a preset braking time.

Meanwhile, the inverter control unit may variably set a time interval in which the third braking mode is executed, based on the rotational speed of the motor at a time point that the braking command has been generated.

Specifically, the inverter control unit may decrease the time interval in which the third braking mode is executed, when the rotational speed of the motor at the time point that the braking command has been generated increases.

Figure 8:
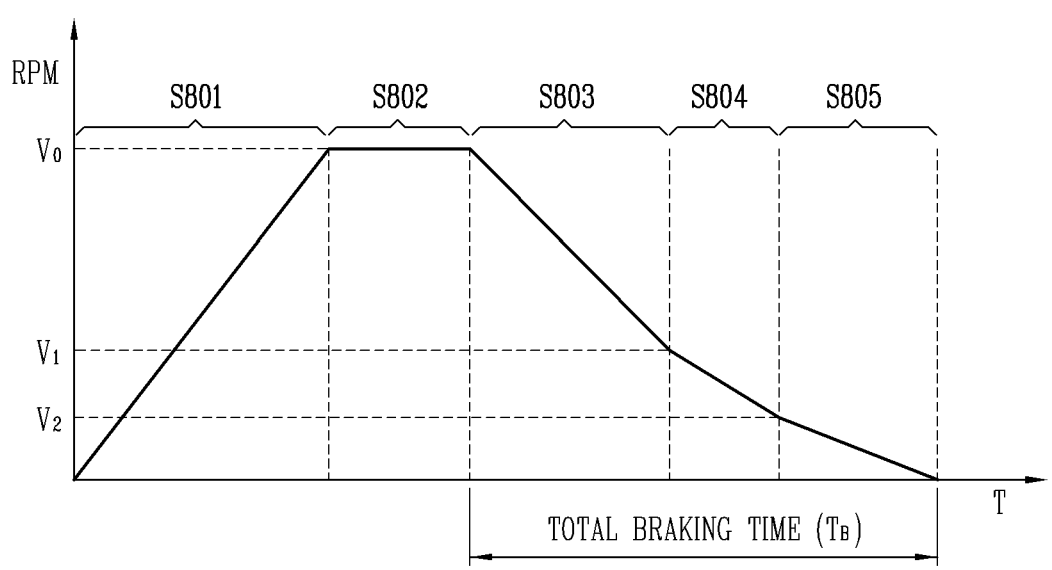
FIG. 8 is a graph related to a motor braking method in accordance with the present disclosure.

Referring to FIG. 8, the inverter control unit may set a first time interval (S803) for executing the first braking mode, a second time interval (S804) for executing the second braking mode, and a third time interval (S805) for executing the third braking mode, respectively, based on the preset braking time.

Especially, the sum of the first to third time intervals S803, S804, and S805 may correspond to the preset braking time TB.

For example, the inverter control unit may set a difference between the preset braking time and a predetermined time value to the first time interval (S803).

In another example, the inverter control unit may detect the rotational speed of the motor at the time point that the braking command has been generated, and set the first to third time intervals based on the detected rotational speed.

In still another example, the inverter control unit may set at least one of the second and third time intervals based on the detected rotational speed, and set a difference between the preset braking time and a difference between the set second and third time intervals to the first time interval.

That is, when the detected rotational speed increases, the inverter control unit may reduce the third time interval for performing the third braking mode corresponding to the dynamic braking.

On the other hand, the inverter control unit may calculate a magnitude of a current (or an amount of currents), which flows in a part of the inverter control unit, using the detected rotational speed when the third braking mode is applied to the motor, and set at least one of the first to third time intervals based on the calculated magnitude of the current.

For example, the inverter control unit may store information related to at least one of a limit temperature and a limit current of the inverter unit and the inverter control unit, and may set at least one of the first to third time intervals based on the stored information.

According to a home appliance of the present disclosure and a motor drive apparatus provided therein, when a motor is suddenly braked, a magnitude (amount) of current flowing in an inverter unit and an inverter control unit can be reduced, which may result in enhancing driving safety of the motor.

The present disclosure can achieve an effect that a size and capacity of the inverter control unit required for the motor to maintain the same performance is reduced. That is, it is sufficient if a limit current of a motor drive apparatus according to the present disclosure is designed based on 5A, compared to the related art in which the limit current of the motor drive apparatus is designed based on 15A.

In addition, the present disclosure can derive an effect of constantly maintaining a braking time of the motor, regardless of a size of a load generated by a rotating object. This may result in increasing an actual working time of the home appliance equipped with the motor.

What is claimed is:
1. An appliance having a motor, the appliance comprising:
an inverter configured to transfer power applied from an input power source to the motor, the inverter comprising a plurality of pairs of switches, each pair of switches being electrically connected in series to each other and configured to generate a phase corresponding to the pair of switches; and
an inverter control unit configured to:
control operation of the inverter,
generate a braking command for stopping rotation of the motor in a preset braking time after the braking command is generated,
based on the braking command being generated, control the inverter to execute a first braking mode to thereby reduce a rotational speed of the motor in a state in which no current flows in the inverter control unit, and
based on execution of the first braking mode, control the inverter to execute at a second braking mode and a third braking mode to thereby reduce the rotational speed of the motor and stop rotation of the motor in a state in which a current flows in the inverter control unit,
wherein each pair of switches comprise an upper-arm switch and a lower-arm switch that are electrically connected in series to each other,
wherein the first braking mode is a redundant braking mode to be executed for a first time interval, the second braking mode is a plugging braking mode to be executed for a second time interval, and the third braking mode is a dynamic braking mode to be executed for a third time interval,
wherein the inverter control unit is configured to:
execute the first braking mode, the second braking mode, and the third braking mode according to a preset order,
in the second braking mode, control the inverter to generate a reverse phase current with respect to a rotating direction of the motor, and
in the third braking mode, turn off all of the upper-arm switches of the plurality of pairs of switches and turn on all of the lower-arm switches of the plurality of pairs of switches,
wherein the preset braking time corresponds to a sum of the first time interval, the second time interval, and the third time interval, and
wherein the inverter control unit is configured to set the third time interval based on an initial rotational speed of the motor at a time point at which the braking command is generated.

2. The appliance of claim 1, wherein the inverter control unit is configured to, in the first braking mode, turn off all of the plurality of pairs of switches.

3. The appliance of claim 1, wherein the inverter control unit is configured to control the inverter to execute the third braking mode based on execution of the second braking mode.

4. The appliance of claim 1, wherein the inverter control unit is configured to control the inverter to execute the first braking mode until the rotational speed of the motor becomes less than or equal to a first speed.

5. The appliance of claim 4, wherein the inverter control unit is configured to control the inverter to execute the second braking mode until the rotational speed of the motor becomes less than or equal to a second speed that is less than the first speed.

6. The appliance of claim 5, wherein the inverter control unit is configured to, based on completion of the second braking mode, control the inverter to execute the third braking mode until the motor stops rotating.

7. The appliance of claim 1, wherein the inverter control unit is configured to decrease the third time interval for executing the third braking mode based on an increase of the initial rotational speed.

8. The appliance of claim 1, wherein the inverter control unit is configured to, based on the preset braking time, set each of the first time interval for executing the first braking mode, the second time interval for executing the second braking mode, and the third time interval for executing the third braking mode.

9. The appliance of claim 8, wherein the inverter control unit is configured to set the first time interval based on a difference between the preset braking time and a predetermined time value.

10. The appliance of claim 8, wherein the inverter control unit is configured to:
   detect the initial rotational speed of the motor at the time point at which the braking command is generated, and
   set the first time interval, the second time interval, and the third time interval based on the initial rotational speed of the motor.

11. The appliance of claim 10, wherein the inverter control unit is configured to:
   set at least one of the second time interval or the third time interval based on the initial rotational speed; and
   set the first time interval based on a difference between the preset braking time and the at least one of the second time interval or the third time interval.

12. The appliance of claim 11, wherein the inverter control unit is configured to decrease the third time interval based on an increase of the initial rotational speed.

13. The appliance of claim 11, wherein the inverter control unit is configured to:
   based on the initial rotational speed, determine a magnitude of current corresponding to the current flowing in the inverter control unit in the third braking mode; and
   set at least one of the first time interval, the second time interval, or the third time interval based on the magnitude of current.

14. The appliance of claim 11, wherein the inverter control unit is configured to:
   store information related to at least one of a limit temperature or a limit current of the inverter and the inverter control unit; and
   set at least one of the first time interval, the second time interval, or the third time interval based on the stored information and the initial rotational speed.

15. The appliance of claim 1, wherein the inverter control unit is configured to:
   set each of the second time interval and the third time interval based on the initial rotational speed of the motor; and
   set the first time interval based on a difference between the preset bricking braking time and a sum of the second time interval and the third time interval.

16. The appliance of claim 1, wherein the preset braking time is constant regardless of a size of a load generated by a rotating object in the appliance.

17. The appliance of claim 1, wherein the inverter control unit is configured to set the first time interval, the second time interval, and the third time interval based on the initial rotational speed of the motor such that the preset braking time is constant.

18. The appliance of claim 1, wherein the inverter control unit is configured to set at least one of the first time interval or the second time interval based on the third time interval such that the preset braking time is constant.

* * * * *